C. F. DENGLER & J. L. RICKETTS
GUARD DEVICE FOR MOTOR VEHICLES.
APPLICATION FILED AUG. 31, 1916.

1,278,119.

Patented Sept. 10, 1918.
6 SHEETS—SHEET 1.

Inventors
Charles F. Dengler
John L. Ricketts
by their Attorneys
Howson & Howson C. F. DENGLER & J. L. RICKETTS.
GUARD DEVICE FOR MOTOR VEHICLES.
APPLICATION FILED AUG. 31, 1916.

1,278,119.

Patented Sept. 10, 1918.
6 SHEETS—SHEET 4.

Inventors.
Charles F. Dengler
John L. Ricketts
by their Attorneys
Howson & Howson C. F. DENGLER & J. L. RICKETTS.
GUARD DEVICE FOR MOTOR VEHICLES.
APPLICATION FILED AUG. 31, 1916.

1,278,119.

Patented Sept. 10, 1918.
6 SHEETS—SHEET 5.

Inventors.
Charles F. Dengler.
John L. Ricketts.
by their Attorneys
Howson + Howson C. F. DENGLER & J. L. RICKETTS.
GUARD DEVICE FOR MOTOR VEHICLES.
APPLICATION FILED AUG. 31, 1916.
1,278,119.
Patented Sept. 10, 1918.
6 SHEETS—SHEET 6.
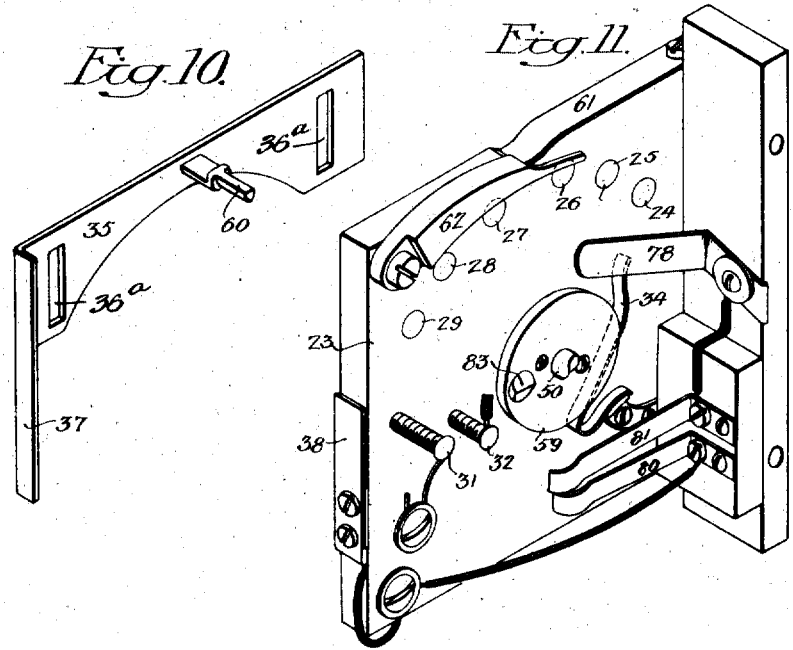
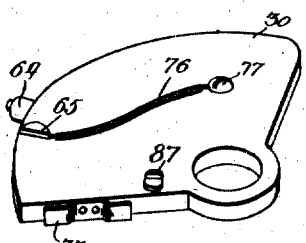
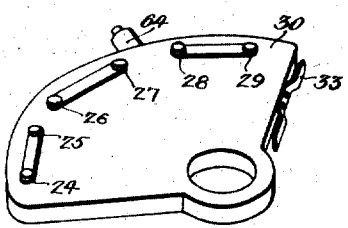
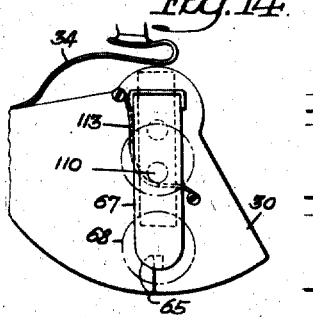
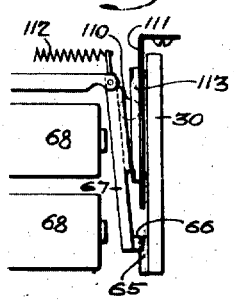
Inventors,
Charles F. Dengler,
John L. Ricketts,
by their Attorneys.
Howson & Howson

UNITED STATES PATENT OFFICE.

CHARLES F. DENGLER AND JOHN L. RICKETTS, OF PHILADELPHIA, PENNSYLVANIA.

GUARD DEVICE FOR MOTOR-VEHICLES.

1,278,119. Specification of Letters Patent. Patented Sept. 10, 1918.

Application filed August 31, 1916. Serial No. 117,907.

*To all whom it may concern:*

Be it known that we, CHARLES F. DENGLER and JOHN L. RICKETTS, citizens of the United States, and residents of Philadelphia, Pennsylvania, have invented Guard Devices for Motor-Vehicles, of which the following is a specification.

One object of our invention is to provide an apparatus conveniently applicable to motor vehicles which in addition to giving an alarm when it is attempted to start or operate such a vehicle while said device is set, shall so control the connections of certain portions of the ignition system of the engine that it is impossible to start or run the latter except when our apparatus has been unlocked or released from its protective or set condition.

We further desire to provide a compact, substantial and reliable device, capable of being controlled by a suitable key, and which shall include means for sounding an alarm (which may be of either the closed or open circuit type or both) whenever any predetermined controlling member or members of a motor vehicle shall be manipulated after our device has been set; the invention contemplating also a combination of parts for disarranging the electrical connections between the igniting devices of the different cylinders of the engine and the current distributing device, so that the explosions in said cylinders shall be out of time, either with or without means whereby certain conductors of the ignition system shall be short circuited or grounded or both, so as to render operation of the engine an impossibility while our device is in its set condition.

A further object of the invention is to provide a device which in addition to giving an audible alarm when an unauthorized person attempts to start and operate a motor vehicle, shall be capable of being so set that it will delay such starting and operation for a prolonged period by seriously disarranging the relative connections of the apparatus comprising the ignition system of said engine.

These objects and other advantageous ends we secure as hereinafter set forth, reference being had to the accompanying drawings, in which, Figure 1 is a side elevation to some extent diagrammatic, illustrating our invention as applied to a motor vehicle;

Figure 3:
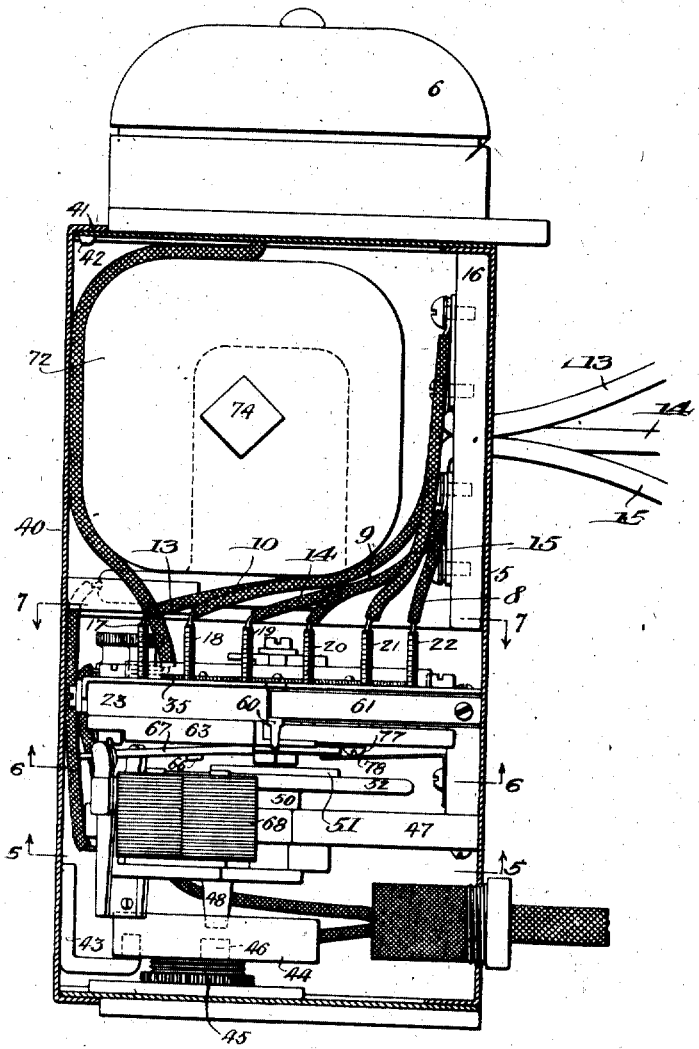
Figs. 3 and 4 are plans partly in section taken at right angles to each other illustrating the preferred form of our alarm device.
Figure 4:
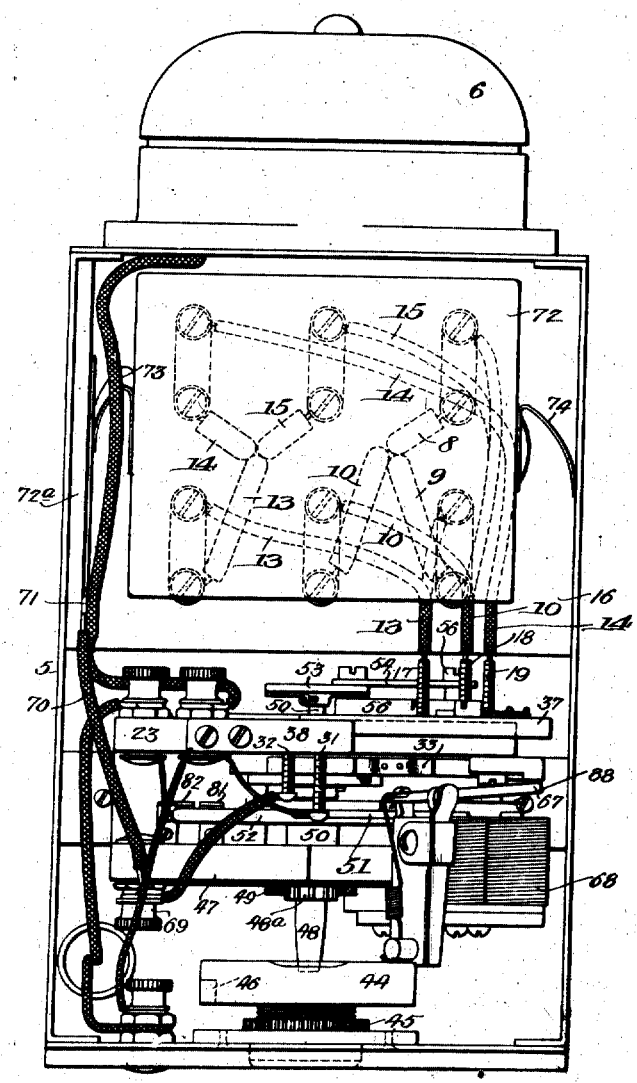
Figures 5, 6:
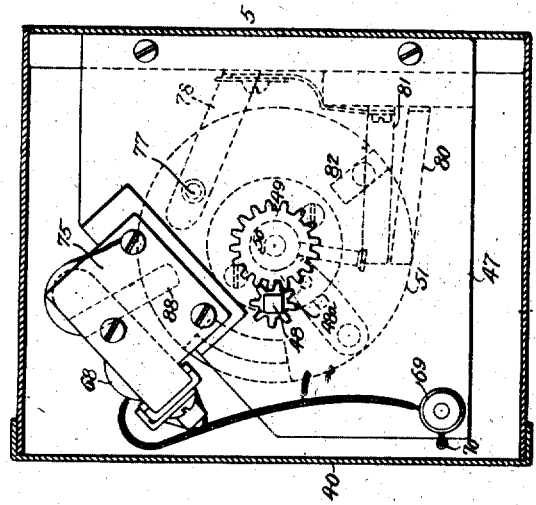
Figure 7:
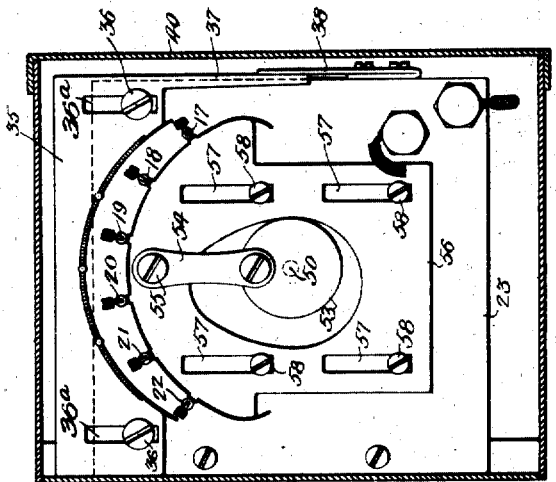
Figure 16:
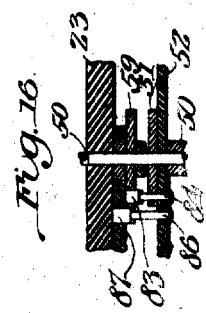
Figure 8:
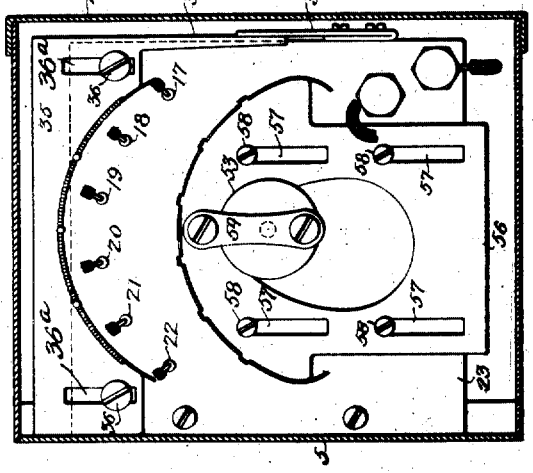
Figure 9:
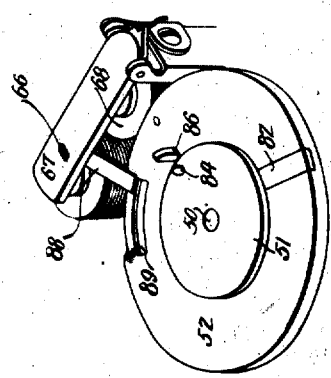

Figs. 5, 6 and 7 inclusive are transverse sections on the lines 5—6, 6—6 and 7—7, respectively of Fig. 3;

Fig. 8 is a section similar to Fig. 7, but showing certain parts of the device in their short circuiting and grounding positions;

Figs. 9 to 12 are perspective views of certain of the details of the apparatus constituting our invention;

Fig. 13 is a perspective view showing that side of the segment 30 opposite that shown in Fig. 12;

Figs. 14 and 15 are respectively front and side elevations of a mechanical device for causing operation of our invention in case of failure of the current actuated elements; and Fig. 16 is a transverse section showing the connections between the segment and the insulating disk.

Figure 1:
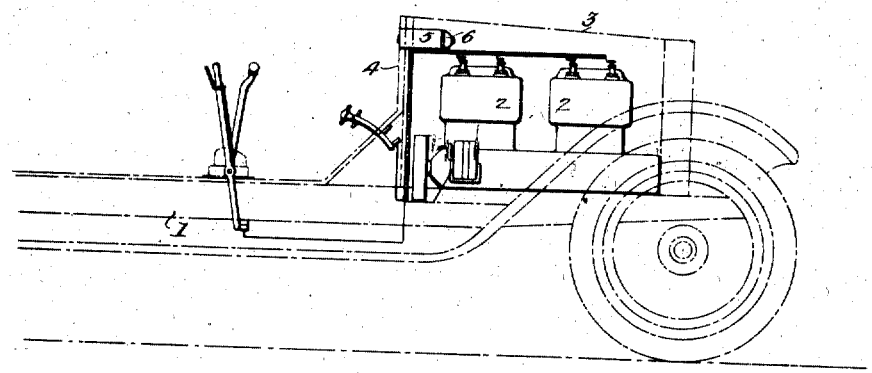
Figure 2:
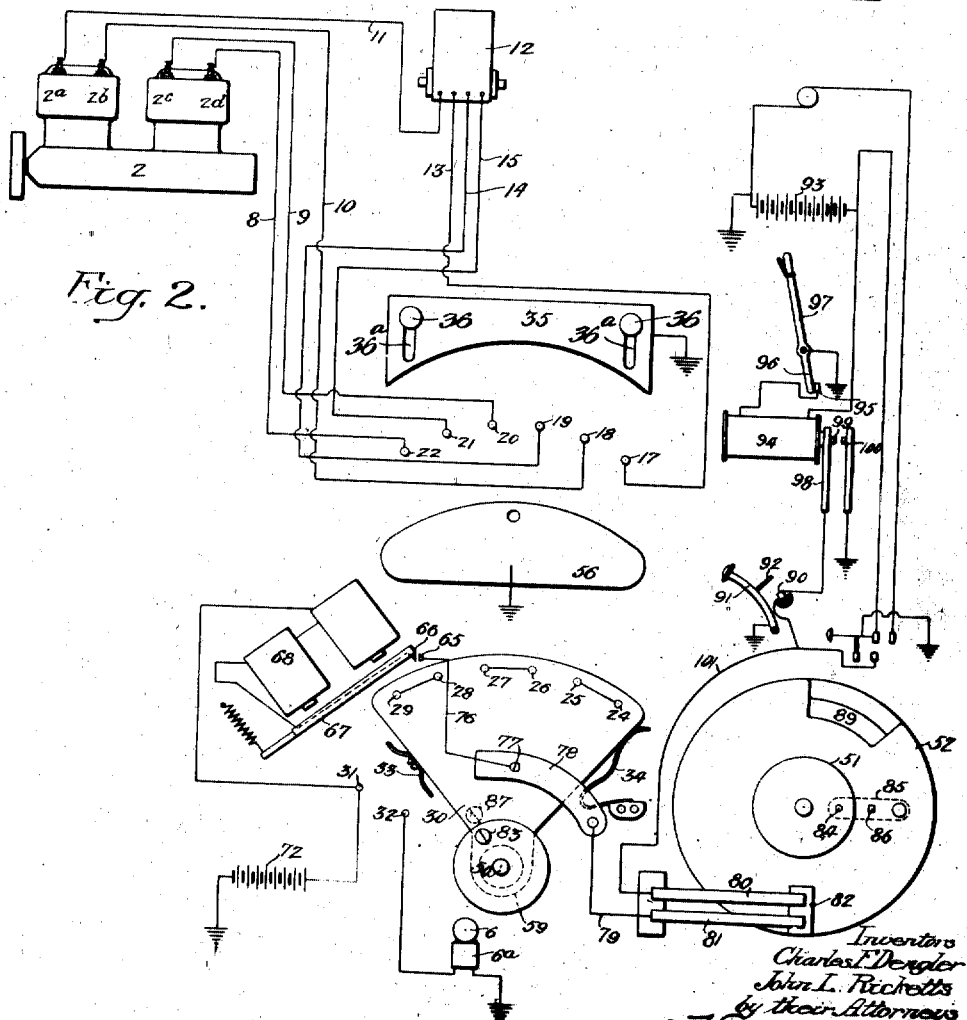
Fig. 2 is a diagram illustrating the preferred arrangement of the apparatus constituting our invention.

In Fig. 1 of the above drawings, 1 represents a portion of the chassis of a motor vehicle having a multi-cylinder engine 2 mounted within a hood 3 which abuts upon a dash board 4. Fixed in this dash board and projecting into the space within the hood above the engine is a box or casing 5 whose front end is exposed on that face of the dash board next to the driver and has an opening for the reception of a key. This casing preferably, though not necessarily has on its opposite end a gong 6 inclosing an electrical alarm device 6ᵃ whereby upon the completion of a circuit hereafter described, said gong or other suitable audible alarm is caused to operate continuously and loudly. The casing is preferably made of substantial plate steel and has entering it a number of conductors depending upon the number of cylinders of the engine and upon the particular number of said cylinders which it is desired to control by the apparatus. One side 40 of said casing is made to be bodily removable and has at one end a flange or edge 41 in which are set one or more projecting studs or pins 42 designed to enter correspondingly placed holes in the end of the casing adjacent the gong.

The opposite end of the removable side 40 has fixed to its inner face a finger 43 projecting at right angles and formed with its end bent parallel with the annular flange of a disk 44 fixed to and rotatable with the barrel of a lock 45 preferably though not necessarily of Yale type, whose key hole opens on the front face of the casing. Said flange of the disk has formed in it a notch 46 which, when in a definite and predetermined position corresponding to that position of the lock barrel in which the key may not be removed therefrom, will permit of the insertion of said end of the locking hook 43 into or its removal from the space inside said flange, thus permitting the locking or removal of the plate 40.

Rigidly though removably mounted within the casing, preferably adjacent the disk 44, are a pair of transverse partition-like supporting structures in the form of plates 47 and 23 made of insulating material such as vulcanized fiber, in the first of which is journaled a rotary spindle 48 having a squared end fitting into a correspondingly shaped, centrally placed openings in the disk 44 so as to be turned thereby.

Fixed to this spindle is a pinion 48$^a$ meshing with a gear 49 of twice the number of teeth and fixed to a spindle 50 suitably journaled in both of the supporting plates 47 and 23—the arrangement being such that two revolutions of the lock barrel are necessary to cause the spindle 50 to make one revolution. Between said plates there is also fixed to said spindle a circular plate or bushing 51 carrying concentrically with it a circular plate 52 of insulating material. To the outer end of said spindle is fixed a crank disk 53 which through a link or rod 54 is connected to a projecting pin or post 55 on a metal plate 56 slidably guided on one face of the frame plate 23. Said plate 56 while circularly curved on one edge, is preferably of a generally rectangular outline and has a number of slots 57 for the reception of screws 58 set in the plate 23 whereby it is compelled to reciprocate in a straight line when the crank disk 53 is turned.

In the present instance I have shown six conductors entering the casing 5, of which those indicated at 8, 9 and 10 lead from the spark plugs of three of the cylinders of a four cylinder engine;—the spark plug of the fourth cylinder being connected in the customary manner through a conductor 11 to the magneto or other current generating and distributing device or system indicated at 12. The three terminals of this device or system to which would customarily be connected the conductors 8, 9 and 10, are connected to three conductors 13, 14 and 15, which with said first three conductors are respectively attached to six terminals mounted on an insulating terminal plate 16 within the upper part of the casing 5.

By means of suitable short and preferably relatively flexible conductors these terminals are respectively connected to a series of terminal posts 17, 18, 19, 20, 21 and 22, mounted on the frame plate 23 in the arc of a circle struck from the same center as the curved edge of the metal plate 56 so that they are simultaneously engaged and short circuited when said plate is moved into one of its extreme positions. The inner ends of said posts are designed to be respectively engaged by contacts 24, 25, 26, 27, 28 and 29, arranged in the arc of the same circle upon a segmental plate 30 of insulating material which is mounted to swing on a metallic bushing 59. This latter is rigidly fixed to the frame plate 23 concentric with its contacts and terminal posts and serves also as a bearing for the spindle 50.

By means of suitable conductors, the contact 24 is permanently connected to the contact 25, and similarly the contacts 26 and 28 are respectively connected to the contacts 27 and 29, so that when the segmental plate 30 is in a predetermined position, the contacts 17, 19 and 21 are respectively in electrical connection with the contacts 18, 20 and 22, thus in effect placing the three terminals of the magneto which are connected to wires 13, 14 and 15, in electrical connection with the spark plugs connected to the conductors 10, 9 and 8. The segment 30 however, as above noted, is free to swing through an angle sufficient to move the contacts 24—28 from engagement with the contacts 17—21 respectively into engagement with the contacts 18—22 respectively, and for the purpose of limiting its movement to this angle we mount on the plate 23 a pair of metallic posts or contacts 31 and 32 which also form part of a switch whose movable contact 33 is so placed on the edge of the segment 30 as to electrically connect them when said segment has been swung through the angle noted. A suitable spring 34 mounted on the plate 23 at all times so acts on said segment 30 as to tend to move it from a position in which the contact 24 engages the post 17 to the position in which the spring contact 33 engages the posts 31 and 32 and said contact 24 also engages the contact 18.

On the front face of the plate 23 we mount a second metal plate 35, providing it with elongated slots 36$^a$ for the reception of a pair of screws 36 whereby it is slidably guided toward and from the posts 17—22, its edge adjacent said posts being formed on the same curve as that on which the posts are mounted in order that it may simultaneously engage and short circuit them when it is at one of the ends of its path of movement. At one side this metal plate has an extension 37 which at all times is in-slidable electrical engagement with a fixed member 38 mounted at one side of the plate 23 and permanently grounded on the casing 5.

The metal plate 35 has projecting from its face over the plate 23 an arm 60 engaged by a flat spring 61 which tends to move it to and hold it in engagement with the various posts 17—21. This arm is also engaged by a swinging arm 62 pivoted at 63 to the plate 23 and designed to act through it to normally hold the plate 35 out of engagement with the terminal posts. For this purpose the segment 30 has projecting radially from its curved edge a stud or pin 64 preferably of insulating material and so placed that when the contact 24 of said segment engages the end of the terminal post 17, it so lifts the arm 62 against the action of the spring 61 as to hold the sliding plate 35 in the desired outer or inactive position.

For the purpose of retaining the segmental plate 30 with its associated parts in the above indicated positions, it has on one face a projection 65 designed to be engaged by a second projection 66 on the armature 67 forming part of an electro-magnet 68 suitably mounted on the supporting plate 47. Said armature is normally held by means of a suitable spring in such position that the projections 65 and 66 retain said segmental plate in a set position, although when by reason of energization of said magnet this armature is attracted, the segmental plate is at once released so that it swings on its supporting structure 59 until its spring contact 33 comes into engagement with and is prevented from further movement by the posts 31 and 32.

The electro-magnet 68 has one of its terminals connected to a binding post 69 carried by the supporting plate 47 and this post in turn is connected through a suitable conductor 70 to a terminal plate 71 mounted upon a body of insulating material 72* upon one side of the casing 5. While the current for operating our apparatus may be taken from a storage battery or any other suitable current source, we preferably utilize a suitable form of portable and conveniently applicable battery 72, having spring contacts 73 and 74 at its opposite ends, and mounted in the casing 5 between the structures projecting from the plate 23 and the end adjacent the gong 6. One of said contacts is in electrical engagement with the plate 71 and its other contact is in similar engagement with the metal of the casing.

The second terminal of the electro-magnet 68 is electrically connected to its pole piece structure 75 and thence through its armature 67 to the catch 65 on the segment 30 (when said catch is engaged by the catch 66). Through a short conductor 76 said catch 65 is electrically connected to a contact 77 projecting from one face of said plate 30 in position to at all times be engaged by a spring contact 78 carried by the supporting plate 47. This spring contact through a conductor 79 is connected to a second spring contact 80 extending substantially parallel with a third contact 81, and these two latter contacts are so placed as to simultaneously engage and be electrically connected by a radially extending contact 82 mounted in the insulating disk 52, when this is in a predetermined position.

The fixed metallic bearing bushing 59 has projecting from it an abutment 83 of flattened V-shaped section designed to coöperate with a spring pressed pin 84 mounted in the metal bushing 51 and riveted to a flat spring 85 to which is also connected a latch 86;—the arrangement being such that when the bushing 51 is so turned as to bring the round pointed pin 84 against the sloping side of the abutment 83, said pin is forced inwardly and is thereby caused to likewise move inwardly the latch 86 so as to withdraw this from any possibility of engagement with the catch or abutment 87 of the segmental plate 30.

It is noted that the armature 67 of the electro-magnet 68 has projecting from it an arm 88 which extends in a line radially toward the spindle 50 immediately adjacent the insulating disk 52 and this latter is of such a thickness and is so placed that it normally prevents such a movement of said armature toward the electro-magnet as would allow the catch 66 on the armature to release the projection 65 of the segment 30. The insulating disk 52, however, has a cutaway portion 89 which when it occupies a position with the two contacts 80 and 81 in engagement with the disk contact 82, will permit movement of the armature toward the pole piece of the electro-magnet and allow of the release of the spring pressed segment 30.

In applying our invention to a motor vehicle which is to be protected thereby, the spring contact 80 is connected to an insulated contact 90 so mounted adjacent some movable operating or other member on the car that it will be grounded on the frame of the machine when such member is moved to the position necessary to put the car in operation or is in any way actuated. For example, I have shown the clutch controlling lever 91 as provided with a contact 92 grounded through it to the frame of the machine and so placed that when said lever is moved into position to throw in the clutch, it will come into engagement with the fixed contact 90.

If desired to control our apparatus through a closed circuit system, we preferably connect one terminal of the storage battery 93 or other current source through a relay magnet 94 to a fixed contact 95 which is engaged by a second contact 96 as long as the emergency brake lever 97 for example, is in position to apply the brake. This electro-magnet controls an armature 98 having a contact 99 capable of engaging with a grounded contact 100 when the current is cut off from its circuit.

In the above described arrangement of parts the movable side 40 of the casing 5 may be released by so turning the key that the resulting turning of the disk 44 brings the opening in the flange thereof immediately over the hooked or bent-in end 43 of the arm. The bottom end of the side may now be swung outwardly, moving said hooked end through the flange opening, after which the side may be raised until the pins 42 clear the openings in the top of the casing. On the other hand, the side may be locked in place by entering the pins 42 in their openings, swinging the lower end inwardly until the end 43 passes through the flange opening of the disk 44 and then turning said disk into such a position that the key may be removed. The flange of said disk with the pins 42 thus effectually prevent removal of said side.

Under normal conditions of use of a car equipped with our device, the latter is first set by inserting the key in the lock and turning it in a counter-clockwise direction. As a result of this motion, the spindle 40 is turned and this through the pinion 48ª and gear 49 likewise turns the spindle 50. The rotation of the latter spindle causes rotation of the metal bushing 51 and of the insulating disk 52 carried thereby, with the result that sooner or later the latch 86 comes into engagement with the projection 87 of the segmental plate 30 and turns this against the action of the spring 34 from a position in which its contact 33 engages the contact posts 32 and 31, into a position in which its catch 65 passes beyond and is thereafter held from return movement by the catch 66 on the armature 67. In the meantime the continued turning of the disk 52 causes the round ended pin 84 to engage the abutment 83 with the result that it is forced back thereby against the action of the spring 85 and carries with it the latch 86 which is thus withdrawn from the projection 87 so that the disk 52 may thereafter be turned in either direction without affecting the segmental plate 30 when this has been set.

In such position said plate has its contacts 24—29 respectively in engagement with the terminal posts 17—22. Moreover, the turning of the plate 30 to the position noted causes its peripheral projection 64 to act through the lever 62 on the arm 60 which projects from the upper short circuiting plate 35, so that the latter is caused to slide bodily away from and remain out of engagement with the terminal posts 17—22. At the same time, through the crank disk 53 and link 54, the inner short circuiting plate 56 is bodily moved down out of engagement with said terminal posts; the key being preferably removed from the lock or its rotation stopped when it has been brought to a definite position, as when it lies in a vertical plane with its serrated edge uppermost.

The motor vehicle or car may now be put in operation and run in the customary manner, for the timing system or magneto 12 has its terminals respectively connected to the spark plugs of the proper cylinders of the engine 2;—the cylinder 2ª being directly connected to the magneto 12 in the customary manner, while the cylinder 2ᵇ through the conductor 10, terminal post 18, conduits 25 and 24, terminal post 17 and conductor 13 is likewise connected in the proper manner to said magneto. The same is true of cylinders 2ᶜ and 2ᵈ.

The operation of the clutch lever 91 and of the emergency brake lever 97 have no effect upon the apparatus, since as shown in Fig. 5 the insulating disk 52 is in such a position that the contact 82 is disengaged from the contacts 80 and 81. Moreover owing to the fact that the cutaway portion 89 of said disk does not lie under the arm 88 of the armature of the electro-magnet 68, said arm is retained in a position in which the catch 66 of the armature cannot be released from the catch 65 of the segmental plate 30, even though the latter should be roughly jarred or shaken.

If it is desired to leave the vehicle with the engine in operation but without our device set to prevent unauthorized running or operation of its apparatus, the key may be turned through part of a revolution to a position in which it may be withdrawn from the lock and while this alters the relative positions of the disk 52 so that it turns the contact 82 in engagement with the contacts 80 and 81 and likewise brings the cutaway portion 89 under the armature arm 88, it does not affect the outer short circuiting plate 35 nor does it cause the inner plate 56 to be moved sufficiently to allow it to engage the terminal posts 17—22. Obviously the contacts 90 and 92 are separated since the clutch is open, while since the brake lever 96 is in its set position the contacts 95 and 96 are engaged, the magnet 94 is energized and the contacts 99 and 100 are separated.

If now it be attempted to operate the car, as by moving the lever 97 to a position to release the emergency brake, the connection between the contacts 95 and 96 will be broken, thus deënergizing the magnet 94 and allowing the contact 99 to engage the contact 100. As a result current is free to flow from the battery 72 through the plate 71, electro-magnet 68, armature 67, catches 66 and 65, conductor 76, contact 77, spring 78, conductors 79, contacts 81, 82 and 80, conductor 101 and contacts 99 and 100 to ground.

This energization of the electro-magnet 68 moves the armature 67, causing the projection 66 to release the projection 65 so that the segmental plate 30 swings under the action of the spring 34 to a position in which its contact 33 engages the two posts 31 and 32. Current is then free to flow from the battery 72 through contacts 32, 33 and 31 to the bell mechanism 6ª and thence to the ground, whereupon the gong or other audible alarm is set in operation and continues to give an alarm. At the same time the movement of the segmental plate 30 to the position indicated removes the projection 64 from under the outer part of the lever 62, allowing this to swing inwardly and permitting the upper short circuiting plate 35 under the action of the spring 61 to move into a position in which it simultaneously engages all of the contacts 17—22. Obviously operation of the engine is instantly stopped since the ignition circuits of the cylinders $2^b$, $2^c$ and $2^d$ are grounded as well as short circuited.

Moreover, the turning of the segmental plate 30 to the position noted completely disarranges the timing of the various cylinders of the engine, for the contact post 17 is no longer engaged by the contact 24 on the segmental plate 30 but is open circuited, while the contact posts 18 and 19 are connected together by the short circuited contacts 24 and 25, so that in case of the failure of the grounding and short circuiting to prevent operation of the engine, a spark is formed in the cylinder $2^b$ at the time when it should be formed in the cylinder $2^c$. Similarly the ignition circuit of the cylinder $2^b$ is open and a spark is formed in the cylinder $2^e$ at the time it should have been formed in the cylinder $2^d$. Obviously therefore the engine cannot be operated and it is a practical impossibility to so re-arrange or re-wire the connections to its spark plugs without the expenditure of considerable time and experiment.

The same results as those above noted would result from an operation of the clutch lever 91, since as before the electro-magnet 68 would be energized and bring about the operation of the alarm, as well as result in the grounding, short circuiting and mis-timing of the ignition system.

If our device is to be set while the engine is idle, the key is turned through the other full revolution in addition to that previously given and is then removed, with the result that the spindle 50 is turned to such an extent that the crank disk 53 through the link 54 forces the lower short circuiting plate 56 into engagement with all of the terminal posts 17—22, thus as with the plate 35 effectually preventing an ignition in any of the cylinders because of the short circuiting and grounding of said terminal posts.

It is to be noted that the movement of the segmental plate 30 to a position in which its contact 33 connects the contact posts 31 or 32, breaks the circuit of the electro-magnet 68 between the catches 65 and 66, so that the alarm alone remains in circuit after the device has operated.

Obviously without departing from our invention there may be provided any desired number of switches 95—96 and 92—90 whereby upon the operation of one or more of the controlling devices of the vehicle or the movement of any of its movable parts, the conductor 101 is grounded and the circuit of the electro-magnet 68 is completed with the results above noted.

In order that the device shall operate to disarrange the circuits of the igniting system of the engine even though the circuit of the electro-magnet 68 should become inoperative, as by open circuiting or failure of the current source 72, we provide the attachment shown in detail in Figs. 14 and 15. This consists of an abutment in the form of a rigid plate 111 supported in any desired manner so as to extend between the member 30 and the armature 67 and having between it and said armature a ball 110 kept from lateral movement and guided by side flanges on said armature. The latter is normally maintained at an angle to the line of the abutment 111 by means of its spring 112, and thus retains the ball in an elevated position.

When, however, the structure carrying the armature, etc., is subject to the vibration incident upon the operation of the engine or the running of the car on which said engine is mounted, such vibration imparted to the armature, allows the ball 110 to gradually move down so as to force said armature toward the poles of the electro-magnet until finally its catch 66 is caused to release the coöperating catch 65 on the segment 30 which thereupon operates as previously described. In turning to the position in which its contact 33 engages the posts 31 and 32, a cam structure 113, carried by said segment so acts upon the ball 110 that this is raised from its lower to its upper position where it is again held by the armature 67 under the action of the spring 112.

We claim:—

1. The combination of a multi-cylinder internal combustion engine having timed igniting devices; and means for automatically disarranging the timing of said devices when it is attempted to start said engine under predetermined conditions.

2. The combination of a multi-cylinder internal combustion engine; igniting devices for the cylinders of said engine; current distributing means including electric circuits connected respectively to said igniting devices; and means for altering the connections of said circuits relatively to said igniting devices under predetermined conditions.

3. The combination of a multi-cylinder internal combustion engine; igniting devices for the cylinders of said engine; current distributing means including electrical circuits connected respectively to said igniting devices; mechanism actuated by said engine; a device for controlling said mechanism; and means governed by said device for automatically disarranging the connections of said circuits relatively to said igniting devices when it is attempted to operate said device.

4. The combination of an engine having igniting means; and an electro-magnetically controlled device for automatically disarranging the timing of said means under predetermined conditions.

5. The combination of an engine; igniting means therefor; means for controlling the operation of mechanism driven from said engine; a switch governed by said means; and a device including an electro-magnet in circuit with said switch for short circuiting and grounding the igniting means of the engine when said controlling means is operated under predetermined conditions.

6. The combination of an engine having an ignition system; means for automatically disarranging the timing of said system under predetermined conditions; and a manually controlled device for controlling the operativeness of said means.

7. The combination of an engine having an ignition system; means for automatically disarranging the timing of said system under predetermined conditions; and a key-controlled device for controlling the operativeness of said means.

8. The combination of an engine having an ignition system; means for automatically disarranging the connections of said system; an electro-magnetic device controlling said means; and a switch in circuit with said device.

9. The combination of an engine having an ignition system; means for automatically disarranging the connections of said system; an electro-magnetic device controlling said means; a switch in circuit with said device; with key-controlled means for setting said disarranging means at will.

10. The combination of an engine having ignition devices for its cylinders; current distributing means; and mechanism connected between said devices and said current distributing means for short circuiting the former under predetermined conditions.

11. The combination of an engine having ignition devices for its cylinders; current distributing means; and mechanism connected between said devices and said means for grounding the latter under predetermined conditions.

12. The combination of an engine having ignition devices for its cylinders; current distributing means; and mechanism connected between said devices and said means for changing the relative times of the delivery of current to said devices under predetermined conditions.

13. The combination of an engine having ignition devices for its cylinders; a current distributing device for the engine; an instrument having a series of terminals of which certain are connected to terminals of the current distributing device; with means for causing said terminals of the instrument to be automatically grounded under predetermined conditions, the same consisting of a grounded plate normally disengaged from the terminals; an electro-magnet normally holding said plate in its disengaged position; and a switch controlling said electro-magnet.

14. The combination of an engine; igniting means therefor; a switch in circuit with said igniting means; and an automatic mechanical device for actuating said switch when it is subject to vibration.

15. The combination of an engine; igniting means therefor; a switch in circuit with said igniting means; and an automatic mechanical device for actuating said switch when it is subject to vibration; with means for automatically resetting said device.

16. The combination of an engine; igniting means therefor; a switch connected to disarrange the circuits of said igniting means; with an automatic, vibration-actuated mechanical device for releasing said switch.

17. The combination in an engine having an ignition system; a switch in circuit with said system and connected to render the same inoperative when in one position; means including an electro-magnet for causing operation of the switch under predetermined conditions; and an automatic mechanical device for causing operation of the switch upon failure of the electro-magnet.

18. The combination of an engine; an ignition system therefor; a controlling switch for said ignition system; an electro-magnet having a movable member controlling said switch; means for causing energization of the electro-magnet under predetermined conditions; with a mechanical device operative upon said movable member to cause operation of the switch in the event of the failure of the electro-magnet.

19. The combination of an engine; an ignition system therefor; a controlling switch connected in said system; a device for governing the operation of said switch consisting of a movable and a fixed member, and a movable element operative to move the movable member when subjected to vibration.

20. The combination of an engine; an ignition system therefor; a switch in circuit with said ignition system; a movable spring-actuated member controlling the operation of said switch; a fixed member extending at an angle to such movable member; and a roller between said members movable under the action of gravity to cause them to separate and permit operation of the switch.

21. The combination of an engine; an ignition system therefor; a switch connected in said ignition system; means controlling the operation of the switch including an electro-magnet having an armature normally holding said switch in a set position; a fixed structure; with a roller operative between the armature and the fixed structure and movable under the action of gravity to separate said elements and release the switch when the device is subjected to vibration.

CHARLES F. DENGLER.
JOHN L. RICKETTS.